(12) United States Patent
Brownlee

(10) Patent No.: US 10,288,281 B2
(45) Date of Patent: May 14, 2019

(54) TWO-PART BLOCK NOZZLE

(71) Applicant: David Allen Brownlee, Franklin, TN (US)

(72) Inventor: David Allen Brownlee, Franklin, TN (US)

(*) Notice: Subject to any disclaimer, the term of this patent is extended or adjusted under 35 U.S.C. 154(b) by 219 days.

(21) Appl. No.: 15/200,290

(22) Filed: Jul. 1, 2016

(65) Prior Publication Data

US 2017/0003019 A1    Jan. 5, 2017

Related U.S. Application Data

(60) Provisional application No. 62/231,305, filed on Jul. 2, 2015.

(51) Int. Cl.
| F23C 10/20 | (2006.01) |
| F23C 10/10 | (2006.01) |
| B01J 8/00 | (2006.01) |

(52) U.S. Cl.
CPC ............. F23C 10/20 (2013.01); F23C 10/10 (2013.01); B01J 8/00 (2013.01)

(58) Field of Classification Search
CPC ... B01J 8/00; F23C 10/10; F23C 10/20; F22B 31/003

USPC .......... 422/139–142; 239/566, 461; 431/170; 122/752

See application file for complete search history.

(56) References Cited

U.S. PATENT DOCUMENTS

| 4,589,841 A * | 5/1986 | Bergkvist | B01J 8/1818 122/4 D |
| 7,028,926 B2 * | 4/2006 | Habib | F28G 1/16 122/392 |
| 9,772,104 B2 * | 9/2017 | Lv | F23C 10/10 |
| 2012/0214109 A1 * | 8/2012 | Begina | F23C 10/20 431/170 |
| 2016/0016136 A1 * | 1/2016 | Campanella | B23K 20/002 422/139 |
| 2016/0281977 A1 * | 9/2016 | Koppers | B01J 8/44 |

FOREIGN PATENT DOCUMENTS

| EP | 2884171 A1 * | 6/2015 | ............... B01J 8/44 |
| JP | 57070306 | * | 4/1982 |

* cited by examiner

*Primary Examiner* — Nina Bhat

(57) ABSTRACT

A two-piece block nozzle is disclosed. In some embodiments, the two-piece nozzle may include a nozzle section and a base section. The nozzle section may be detachably engaged to the base section. The nozzle section may be formed with a temperature resistant material such as, for example, a chrome-nickel alloy or a stainless steel alloy. The base section may be formed with a relatively lower cost material such as, for example, a ductile iron material.

15 Claims, 5 Drawing Sheets

TWO-PART BLOCK NOZZLE

CROSS-REFERENCE TO RELATED APPLICATION

This application claims the benefit under 35 USC 119(e) of the commonly owned U.S. Provisional Application No. 62/231,305 entitled "Two Part Block Nozzle Used in Fluidized Bed Boilers" filed on Jul. 2, 2015, the entirety of which is incorporated by reference herein.

TECHNICAL FIELD

The present embodiments relate generally to block nozzles, and specifically to block nozzles used within fluidized bed boilers.

BACKGROUND OF RELATED ART

A fluidized bed is formed when a solid particulate is placed under appropriate conditions to cause the solid mixture to behave as a fluid. One manner of achieving a fluidized bed is to introduce a pressurized fluid through the particulate medium. Often this results in the medium having many properties and characteristics of normal fluids, such as the ability to free-flow under gravity, or to be pumped using fluid type technologies.

In many cases, a nozzle is used to introduce air into a fluidized bed boiler to aid and/or promote combustion. The environment of the bed boiler may be hostile. For example, temperatures of a fluidized bed boiler may exceed 1700 degrees Fahrenheit for a period of time. In addition, the solid mixture in the bed boiler may abrade or otherwise wear the nozzles.

Nozzles are often embedded, at least partially, within a refractory material to insulate and protect the combustion zones. The refractory material may make replacing the nozzles difficult.

Thus, there is a need for an improved nozzle design to increase the service life and reduce costs associated with the nozzles.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A block nozzle is disclosed. The block nozzle may include a base section with a first air inlet, a first air outlet and a first portion of an engagement assembly disposed proximate to the first air outlet. The block nozzle may also include a detachably engaged nozzle section that may include a second air inlet, a second air outlet configured to direct air flow around an outer surface of the nozzle section, and a second portion of the engagement assembly proximate to the second air inlet and configured to mate with the first portion of the engagement assembly.

In another embodiment, a fluidized bed combustor is disclosed. The fluidized bed combustor may include a combustion chamber and a block nozzle to introduce air into the combustion chamber. The block nozzle may include a base section with a first portion of an engagement assembly disposed proximate to a first air outlet and a nozzle section detachably engaged to the base section. The nozzle section may include a second portion of the engagement assembly disposed proximate to a second air inlet and configured to mate with the first portion of the engagement assembly.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The present embodiments are described below in the context of fluidized bed boilers for simplicity only. It is to be understood that the present embodiments are equally applicable for other devices and/or systems that use nozzles.

Figure 1:
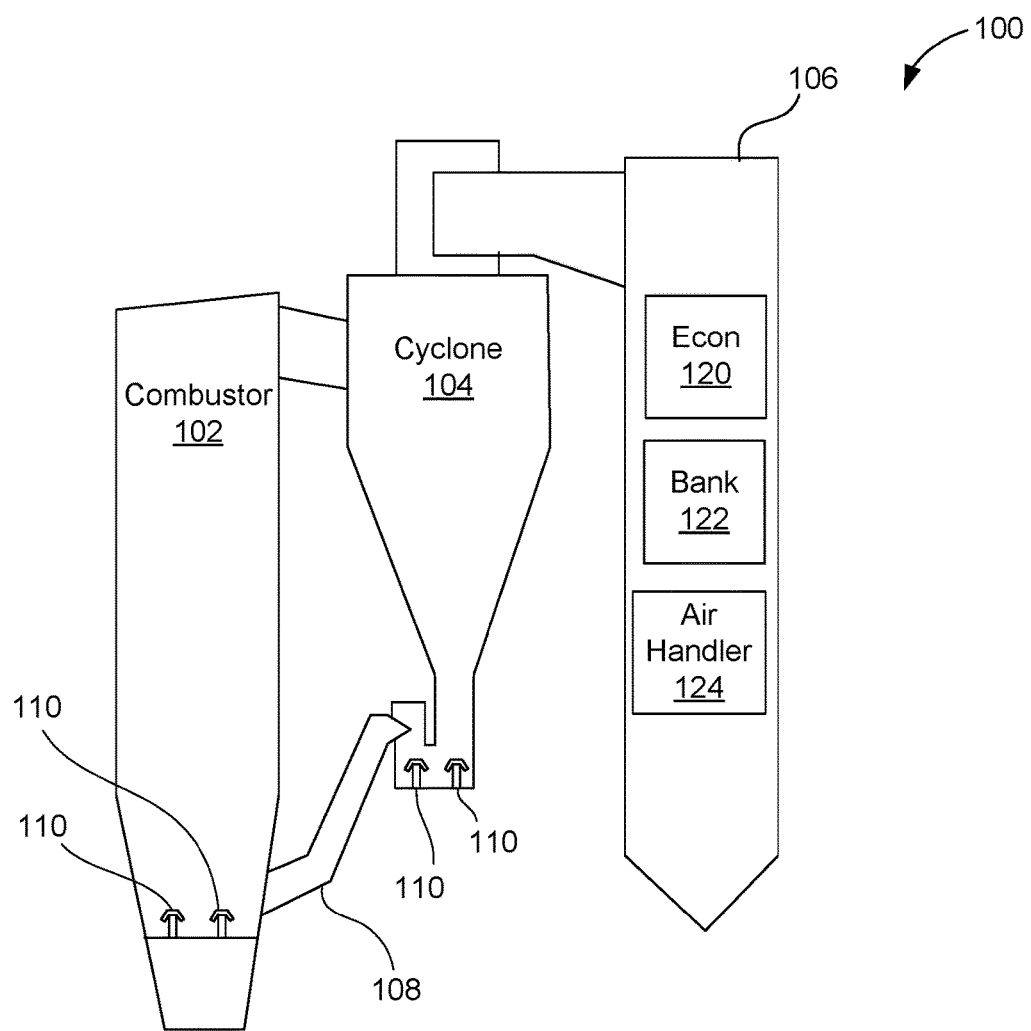
FIG. 1 depicts an exemplary fluidized bed combustion system, in accordance with some embodiments.

FIG. 1 depicts an example fluidized bed combustion system 100, in accordance with some embodiments. The fluidized bed combustion system 100 may include a combustor 102, a cyclone 104, and a boiler bed 106. In some embodiments, the fluidized bed combustion system 100 may be a circulating fluidized bed combustion system in which unburnt fuel and hot ash is recirculated from the cyclone 104 and returned to the combustor 102.

Fuel, often in a solid particulate form, may be introduced into the combustor 102 (sometimes referred to as a combustion chamber). The combustor 102 may include a plurality of block nozzles 110 for the introduction of air into the combustor 102. In some embodiments, the block nozzles 110 may be affixed into the floor and/or walls of the combustor 102. The fuel may be burned in the combustor 102 with the aid of air introduced by the block nozzles 110. For example, the block nozzles 110 may introduce air and/or oxygen in to the combustor 102 and may also mix and/or agitate (e.g., fluidize) the fuel. The combustor 102 may be coupled to the cyclone 104 via a connecting duct 108. Fuel particles, including partially burned fuel particles, may be transferred from the combustor 102 to the cyclone 104. The cyclone 104 may separate fuel particles from heated air and return the fuel particles to the combustor 102. In some embodiments, the cyclone 104 may also include one or more block nozzles 110 to fluidize the fuel. The cyclone 104 may be coupled to the boiler bed 106. In some embodiments, the connecting duct 108 may also include one or more block nozzles (not shown for simplicity). In some embodiments, the boiler bed 106 may function, at least in part, as a heat exchanger and allow energy from the heated air to be transferred to other mediums (e.g., air, water, etc.) to power machinery, generate energy, and/or otherwise be dissipated or used. In some embodiments, the boiler bed may include an economizer 120, a bank 122, and an air handler 124.

Figure 2:
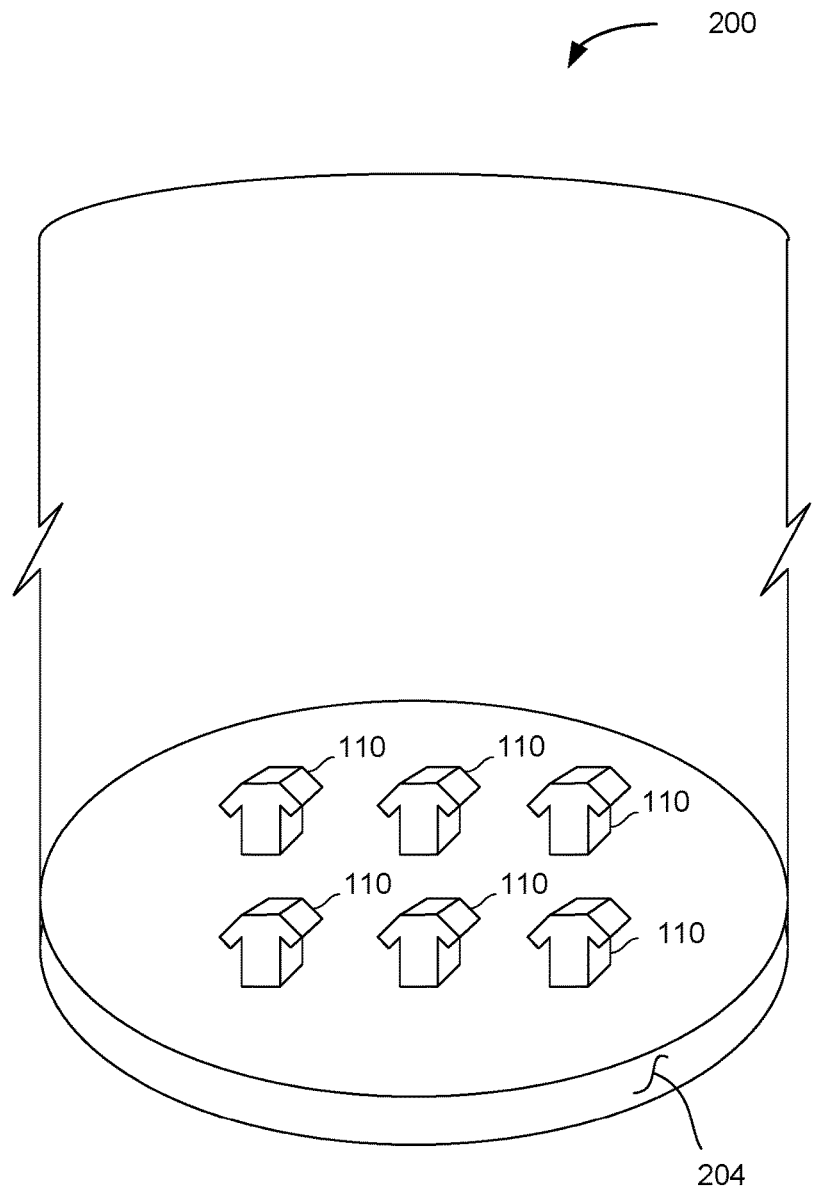
FIG. 2 shows a simplified diagram 200 of a section of a combustor.

FIG. 2 shows a simplified diagram 200 of a section of the combustor 102. As described above with respect to FIG. 1, the combustor 102 may include a plurality of block nozzles 110. Although only six block nozzles 110 are shown for simplicity, the combustor 110 may include any technically feasible number of block nozzles.

Combustion of the fuel particles may occur at very high temperatures. In order to protect and increase efficiency of the combustor 102, one or more sides and floor of the combustor 102 may be coated with an insulating and/or protecting agent for example, a refractory material 204. Thus, in some embodiments, the block nozzles 110 may be at least partially embedded in the refractory material 204. For simplicity, the refractory material 204 is only depicted on the floor of the combustor 102 in the simplified diagram 200.

The high heat of combustion as well as abrasive properties of the fuel particles may cause the block nozzles 110 to become worn and need replacement. The refractory material 204 surrounding the block nozzles 110 may hinder the replacement of the block nozzles 110. For example, the refractory material 204 may need to be chipped away from the block nozzles 110 before the block nozzles 110 may be removed.

Figure 3:
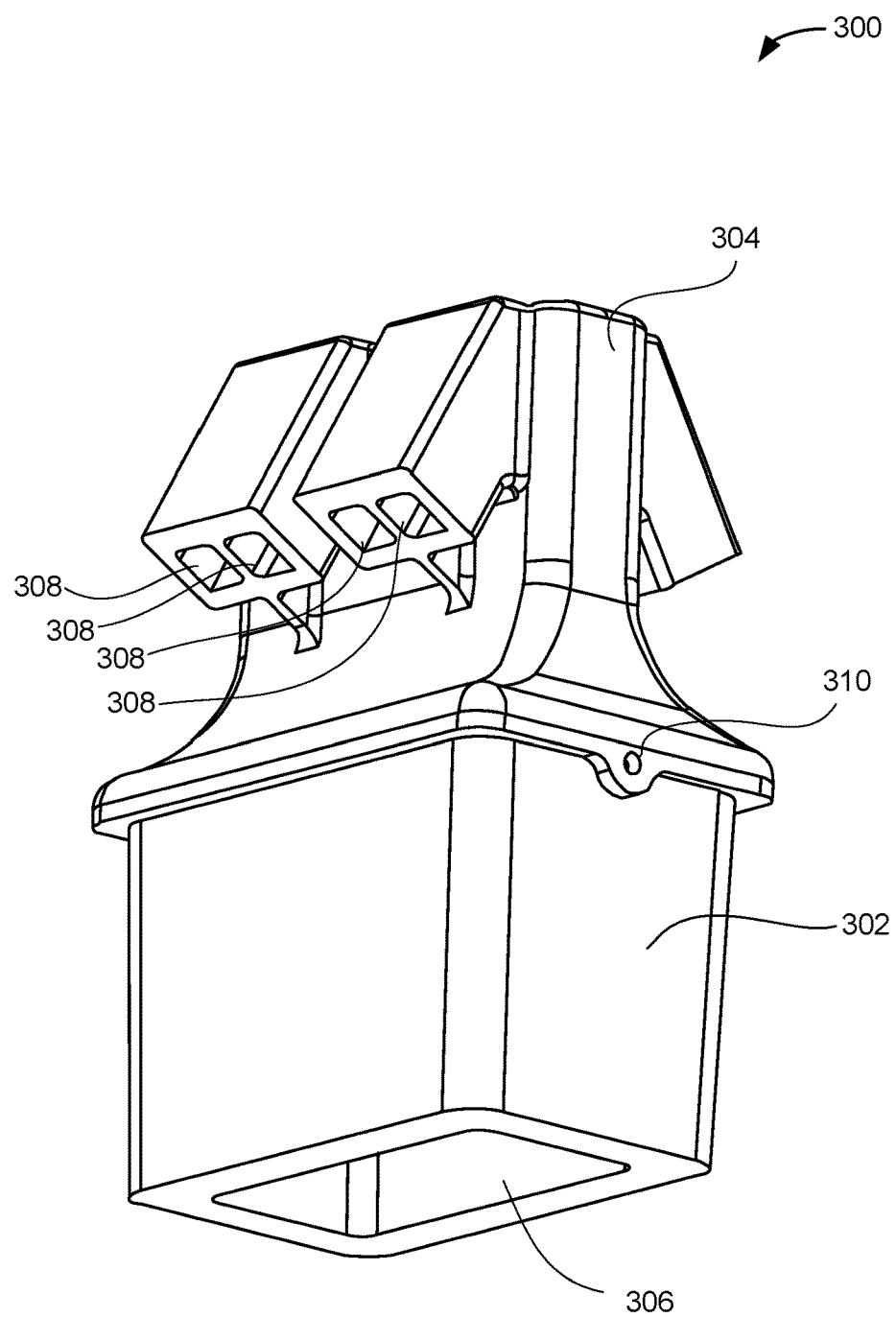
FIG. 3 depicts a block nozzle, in accordance with some embodiments.

FIG. 3 depicts a block nozzle 300, in accordance with some embodiments. The block nozzle 300 may be an embodiment of the block nozzles 110 of FIGS. 1 and 2 described above. The block nozzle 300 may include a base section 302 and a nozzle section 304. The base section 302 may be detachably engaged to the nozzle section 304. In other words, in a first configuration, the base section 302 and the nozzle section 304 may be engaged together (e.g., mated) to form the block nozzle 300. In a second configuration, the base section 302 may be separated from the nozzle section 304. In some embodiments, the base section 302 may be engaged to the nozzle section 304 with a fastener, such as an engagement pin (not shown for simplicity) inserted through a receiving hole 310 included in both the base section 302 and nozzle section 304.

Air may be introduced to the block nozzle 300 through a block nozzle air inlet 306 included in the base section 302. Air may exit though one or more nozzle ports 308 included in the nozzle section 304. In some embodiments, the base section 302 may be formed with a different material than the nozzle section 304. For example, the base section 302 may be formed with a low cost, ductile iron material, particularly when the base section 302 is set into the refractory material 204 of FIG. 2 (not shown for simplicity). In contrast, the nozzle section 304 may be formed from materials suitable for high temperature applications, such as a stainless steel alloy or a chrome-nickel alloy. In some embodiments, the stainless steel alloy may be an American Society for Testing and Materials International (ASTM) HK40 metal alloy. In still other embodiments, the nozzle section 304 may be coated with a ceramic coating. Ceramic coatings may provide improved temperature control, wear protection, heat resistance, friction reduction, and/or erosion protection for the nozzle section 304.

It is known in the art that the suitability of a given metal for use at higher temperatures corresponds to the metallurgical design of the metal. Heat treatment practices notwithstanding, the suitability of a given metal alloy for use at higher relative temperatures may correspond to the amount of Molybdenum, Vanadium, Titanium, Nickel, Chrome, and/or other constituents in the metal alloy. Therefore, relative costs of the nozzle section 304 verses the base section 302 may be determined, at least in part, by the amount of Molybdenum, Vanadium, Titanium, Nickel, Chrome and/or other constituents in the metal alloy, where nozzle section 304 would contain a higher percentage of the aforementioned constituents in it's metal alloy verses base section 302.

In some embodiments, the nozzle section 304 may be coated with a ceramic coating. High temperature ceramics may be used to coat and/or construct the nozzle section 304. Ceramic coatings may provide improved temperature control, wear protection, heat resistance, friction reduction, and/or erosion protection for the nozzle section 304.

The two piece design of the block nozzle 300 may allow easy servicing and/or replacement of at least a portion of the block nozzle 300. For example, when the base section 302 is surrounded by the refractory material 204, the nozzle section 304 may be replaced by removing the engagement pin (not shown for simplicity). A new nozzle section 304 may then be engaged to the existing base section 302 and affixed with the engagement pin. The two piece design may also be a lower cost design since the ductile iron material may be a lower cost than the stainless steel alloy or the chrome-nickel alloy.

Figure 4:
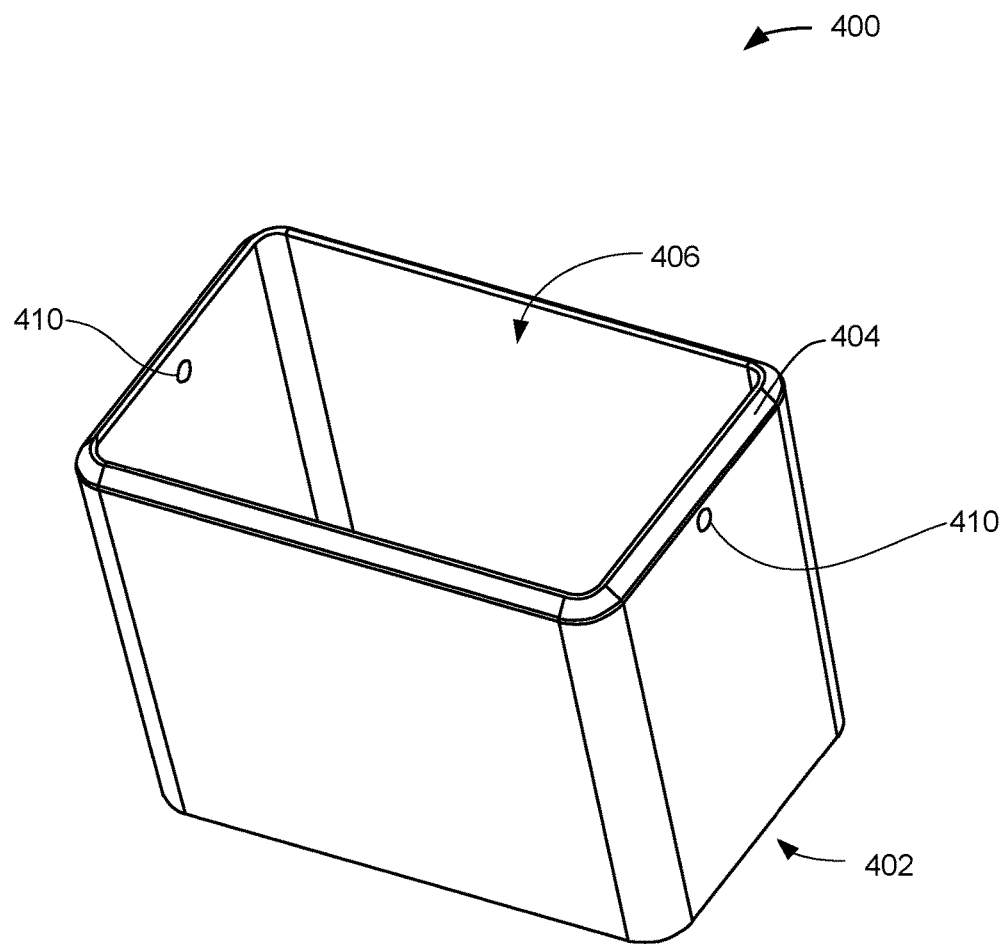
FIG. 4 is an example embodiment of a base section of a block nozzle.

FIG. 4 is an example embodiment of a base section 400. The base section 400 may be an embodiment of the base section 302 of FIG. 3. The base section 400 may be formed from a relatively soft and/or relatively lower cost material such as a ductile iron material, particularly when the base section 400 is set into and/or surrounded by a refractory material.

Base section 400 may include an air inlet 402, an air outlet 406 and one or more engagement holes 410. The air inlet 402 may function as the block nozzle air inlet 306 shown in FIG. 3. A first portion of an engagement assembly 404 may be disposed proximate to the air outlet 406. The first portion of the engagement assembly 404 may allow the base section 400 to be detachably engaged to the nozzle section 304 (see FIG. 3).

Figure 5:
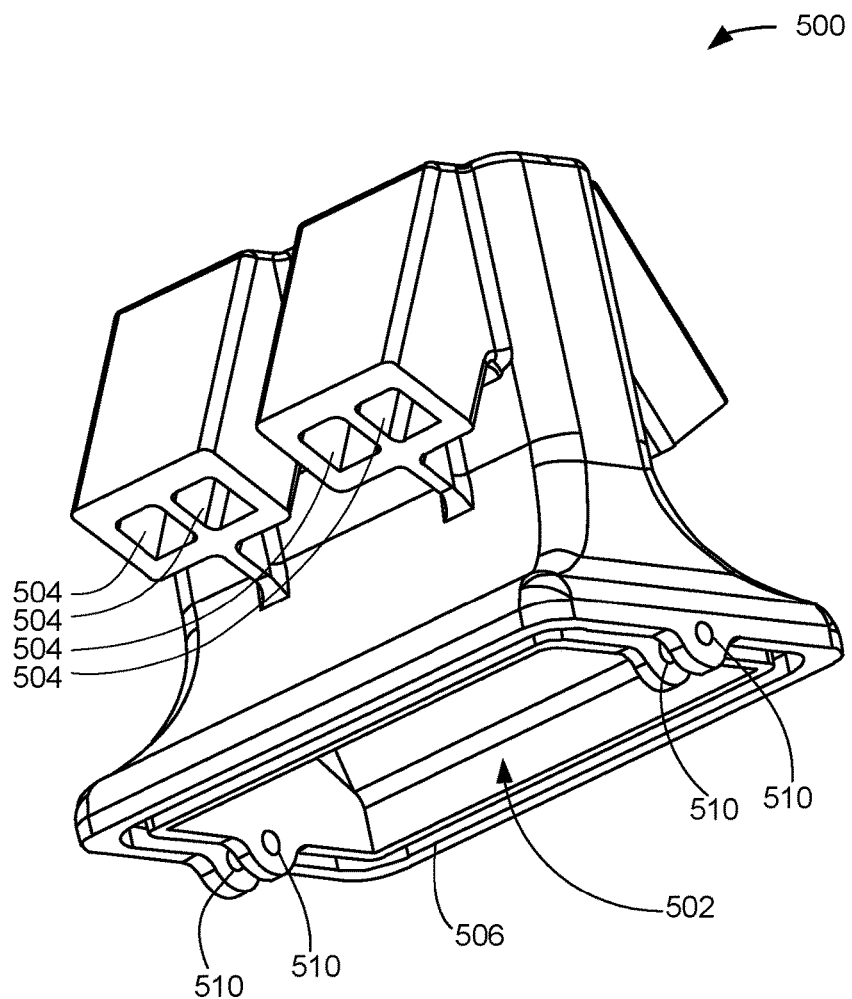
FIG. 5 is an example embodiment of a nozzle section of a block nozzle.

FIG. 5 is an example embodiment of a nozzle section 500. The nozzle section 500 may be an embodiment of the nozzle section 304 of FIG. 3. The nozzle section 500 may be formed from a temperature resistant material such as a chrome-nickel alloy or a stainless steel alloy. The nozzle section 500 may include an air inlet 502 and a plurality of air orifices 504. The air orifices 504 may be an embodiment of the nozzle ports 308 of FIG. 3. The air orifices 504 may be disposed around the nozzle section 304. In some embodiments, the air orifices 504 may direct air flow toward the air inlet 502 around an exterior portion of the nozzle section 500. In other embodiments, the air orifices 504 may direct air flow in other directions relative to the nozzle section 500.

Proximate to and/or integral with the air inlet 502 may be a second portion of the engagement assembly 506. In some embodiments, the second portion of the engagement assembly 506 may include a receiving structure to receive the first portion of the engagement assembly 404 of the base section 400. For example, the first portion of the engagement assembly 404 may be inserted into the second portion of the engagement assembly 506. In some embodiments, the second portion of the engagement assembly 506 may be stepped and/or may include one or more grooves to receive the first portion of the engagement assembly 404. Stepped features and/or grooves may reduce air leakage between the base section 400 and the nozzle section 500. In at least one embodiment, the first portion of the engagement assembly and/or the second portion of the engagement assembly 506 may include an insulating material such as refracil and/or other castable refractory materials to further reduce any air loss.

In some embodiments, the nozzle section 500 may include one or more receiving holes 510 to receive a fastener such as an engagement pin as shown to lock the nozzle section 500 to the base section 400. In other embodiments, the nozzle section 500 and/or the base section 400 may include sliding channels, twist/turn locking features, bolt, threads, or any other technically feasible features to lock the nozzle section 500 to the base section 400.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A block nozzle for a fluidized bed boiler, the block nozzle comprising:
   a base section comprising a first air inlet;
   a first air outlet;
   a first portion of an engagement assembly disposed proximate to the first air outlet; and
   a nozzle section detachable engaged to the base section, comprising:
   a second air inlet;
   a second air outlet configured to direct air flow around an outer surface of the nozzle section; and
   a second portion of the engagement assembly disposed proximate to the second air inlet and configured to mate with the first portion of the engagement assembly wherein the base section is engaged to the nozzle section with a fastener inserted through receiving holes in both the base section and the nozzle section; and wherein the second portion of the engagement assembly includes one or more grooves perimetrically arranged to receive the first portion of the engagement assembly and wherein the base section is optionally surrounded by refractory material.

2. The block nozzle of claim 1, wherein the nozzle section is from the group consisting of a chrome-nickel alloy and a stainless steel alloy.

3. The block nozzle of claim 1, wherein the base section is formed with a ductile iron material.

4. The block nozzle of claim 1, further comprising a fastener configured to engage the first portion of the mating assembly with the second portion of the mating assembly.

5. The block nozzle of claim 1, wherein the nozzle section comprises a plurality of orifices to direct air flow around an outer surface of the nozzle section.

6. The block nozzle of claim 1, wherein the nozzle section is coated with a ceramic material.

7. The block nozzle of claim 1, wherein the nozzle section is constructed, with a ceramic material.

8. A fluidized bed system comprising:
   a combustion chamber; and
   a block nozzle to introduce air into the fluidized bed system, the block nozzle comprising:
   a base section comprising a first air inlet;
   a first air outlet;
   a first portion of an engagement assembly disposed proximate to the first air outlet; and
   a nozzle section detachable engaged to the base section, comprising:
   a second air inlet;
   a second air outlet configured to direct air flow around an outer surface of the nozzle section; and
   a second portion of the engagement assembly disposed proximate to the second air inlet and configured to mate with the first portion of the engagement assembly wherein the base section is engaged to the nozzle section with a fastener inserted through receiving holes in both the base section and the nozzle section; and wherein the second portion of the engagement assembly includes one or more grooves perimetrically arranged to receive the first portion of the engagement assembly and wherein the base section is optionally surrounded by refractory material.

9. The fluidized bed system of claim 8, further comprising:
   a refractory material to insulate the combustion chamber and surround the base section of the block nozzle.

10. The fluidized bed system of claim 8, further comprising a fastener configured to engage the base section to the nozzle section.

11. The fluidized bed system of claim 8, wherein the nozzle section is from the group consisting of a chrome-nickel alloy and a stainless steel alloy.

12. The fluidized bed system of claim 8, wherein the nozzle section is coated with a ceramic material.

13. The fluidized bed system of claim 8, wherein the nozzle section is constructed with a ceramic material.

14. The block nozzle of claim 1, wherein the second portion of the engagement assembly comprises grooves to receive the first portion of the engagement assembly.

15. The block nozzle of claim 1, wherein the engagement assembly is configured to reduce air leakage between the base section and the nozzle section.

* * * * *